Sept. 29, 1936.  H. HORN  2,055,689
MACHINE FOR WORKING LIQUID, PULVERULENT, AND GRANULAR MASSES
Filed Feb. 2, 1933  2 Sheets-Sheet 1
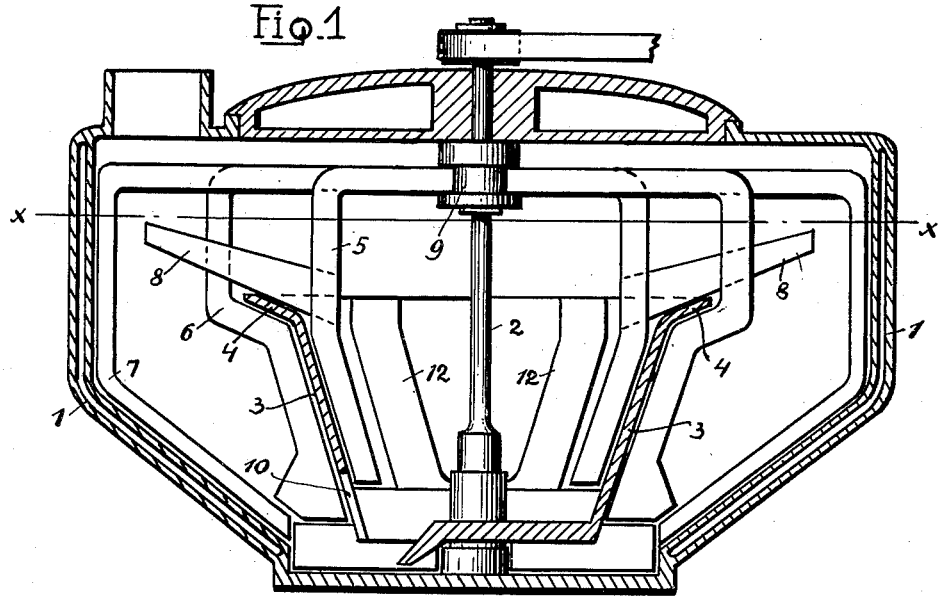
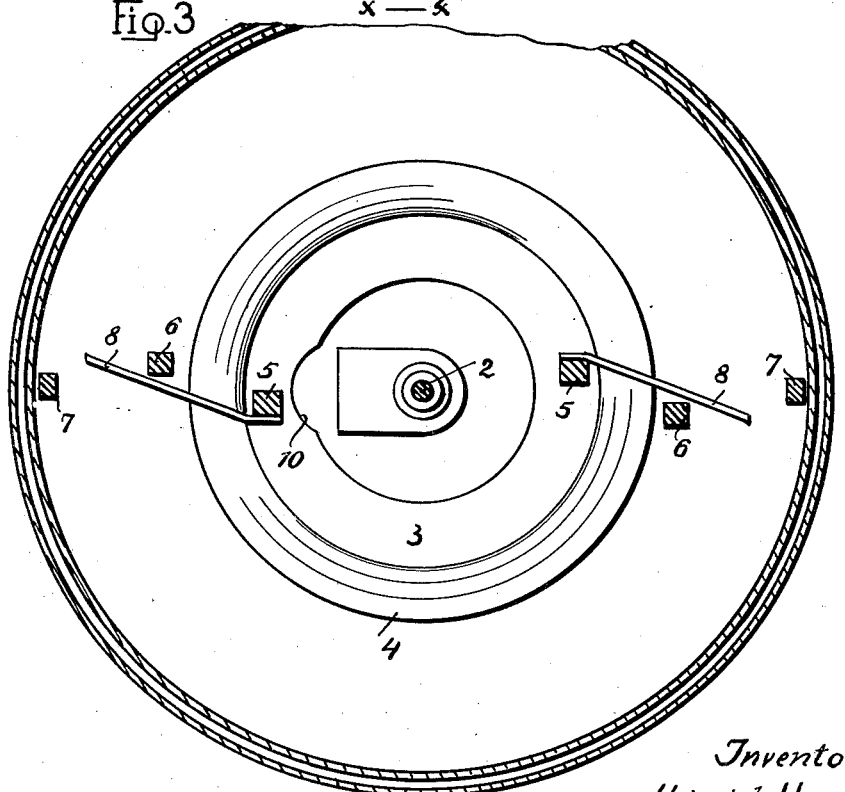
Inventor:
Heinrich Horn.

Sept. 29, 1936.　　　　　　　H. HORN　　　　　　　2,055,689
MACHINE FOR WORKING LIQUID, PULVERULENT, AND GRANULAR MASSES
Filed Feb. 2, 1933　　　2 Sheets-Sheet 2
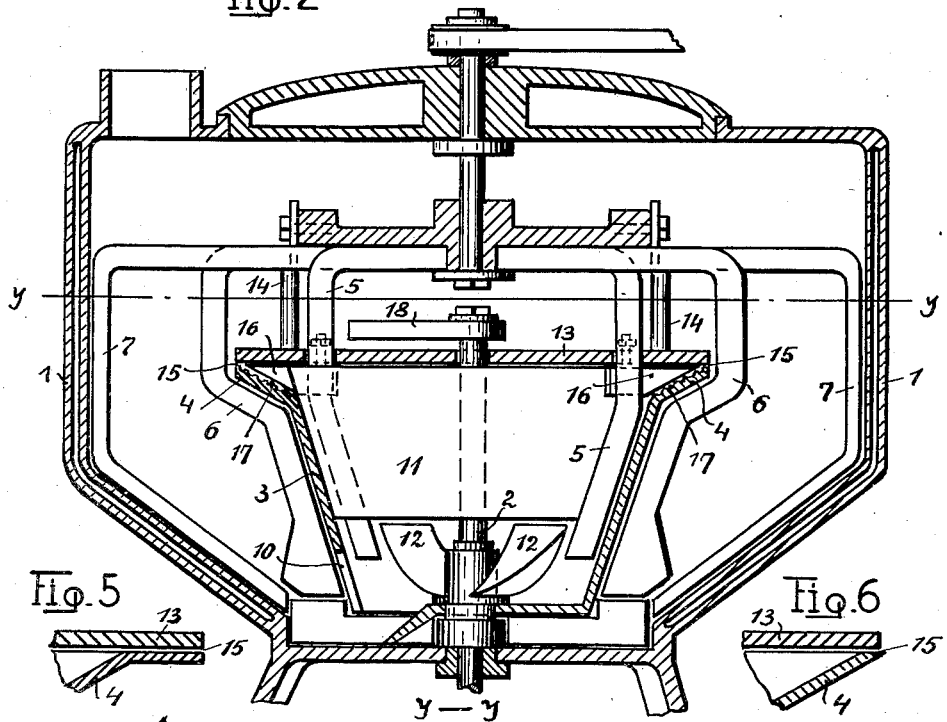
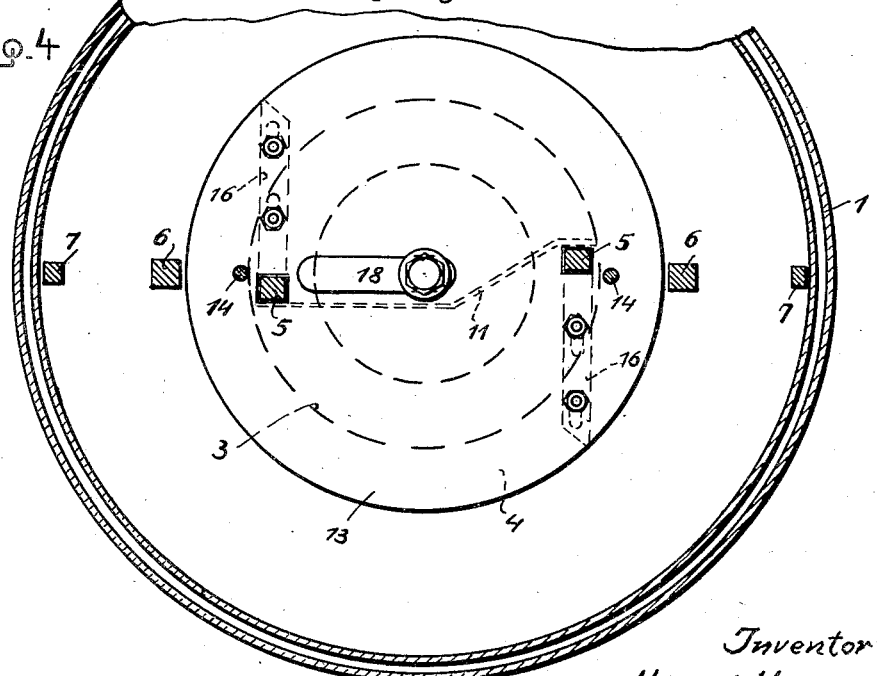
Inventor:
Heinrich Horn.

Patented Sept. 29, 1936

2,055,689

UNITED STATES PATENT OFFICE 2,055,689

MACHINE FOR WORKING LIQUID, PULVERULENT, AND GRANULAR MASSES

Heinrich Horn, Dresden, Germany, assignor to the firm J. S. Petzholdt, Bezirk Dresden, Germany Application February 2, 1933, Serial No. 654,906
In Germany February 5, 1932

1 Claim. (Cl. 259—107)

This invention relates to a machine for working liquid, pulverulent and granular masses.

According to the invention, the machine is intended for mixing, dissolving, treating and refining masses of the kind mentioned by causing them to be moved by a rotary conveyor within a casing adapted to be heated or cooled. The substances are sucked up by the rotary conveyor at the bottom, then moved up the inner wall of the conveyor which is hollow and thrown by centrifugal force over the edge of the conveyor and onto the inner wall of the casing whence they drop down and are drawn in again by the conveyor. Ribs and strippers are provided to move up the substances in the conveyor, to revolve them and to press them through the small gaps between the rotary conveyor, the wall of the casing and the strippers so as to insure thorough crushing and grinding of the granules of the substances and the production of a very fine mass.

A special feature of the machine is that the substances to be treated are so thoroughly mixed that all portions thereof will be brought into contact with the wall of the casing, to which a certain temperature has been given, and thus be absolutely uniformly heated or cooled.

This object is attained chiefly by providing the hollow rotary conveyor at its top end with an outwardly expanding flange having the shape of a funnel and cooperating in the rotation of the conveyor, and by arranging above this flange stripper arms projecting tangentially beyond the flange for a suitable distance. In this way, even if the rotary conveyor moves slowly, the substances rising within will be forced beyond the flange and against the stripper members which will push them up to the wall of the casing. Disintegration and refinement of the substances will be improved still more or perfect emulsification of the mass attained if mixing is carried on under pressure. For this purpose the rotary conveyor is covered at its upper flange so as to leave a circumferential gaplike opening between the cover and the flange of the conveyor, through which opening the substances rising within the conveyor are forced by over-pressure due to centrifugal action and thrown against the wall of the casing. The cover and the conveyor are separately arranged and rotated separately and at different speeds so as to produce a relative motion between them and cause the substances entering between the flange and the cover into the annular gap to be thoroughly revolved therein, so that while the substances are forced through the gap all parts thereof, including the microscopically small droplets or particles, and all the lumps and granules will be compressed, rolled together, dissolved, broken up, divided, finely ground and emulsified with the result that within a very short time liquids will be mixed, powdery substances disintegrated and refined or viscous substances completely emulsified in a quicker and better manner than is hitherto possible.

To increase the efficiency of the machine and to improve the ejection of the mass from the rotary conveyor the latter has an inner partition which prevents the substances in the top of the conveyor from cooperating in the rotation. In connection with this partition one or several adjustable wedgelike strippers may be radially or tangentially disposed relative to the rotary conveyor in the annular gap to strip off the substances entering the gap and guide them towards the outside. According to the nature of the substances treated, the funnel-shaped flange of the conveyor is either smooth, rough or provided with a single or multiple thread spiral slot for conveying the substances from the strippers to the outside. The tangential arrangement of the strippers increases, above all, the pressure in the annular gap. The cover can be vertically adjusted relative to the flange of the conveyor so as to provide for adjustment of the gap, and it may be arranged so that it remains either stationary or rotates with the strippers. Another stripper rotates above the cover.

By way of example, the invention is illustrated in the accompanying drawings, in which Figures 1 and 2 are vertical sections of two embodiments of the invention; Fig. 3 is a plan on the line $x$—$x$, of Fig. 1; Fig. 4, a plan on the line $y$—$y$, of Fig. 2; and Figs. 5 and 6 are detail views of different gaps.

Referring to the drawings, in the casing 1 which can be heated or cooled a hollow rotary conveyor 3 is arranged on a vertical shaft 2 driven from without. The top flange 4 of the conveyor 3 has a funnel-shape and projects outwardly. The arms 5, 6 and 7 serve for thoroughly mixing the substances and stripping them off from the wall of the conveyor 3 and the inner wall of the casing 1. The arms 5 carry one or several strippers 8 which, corresponding to the funnel-shape of the flange of the conveyor 3, extend upwardly in oblique direction and tangentially project beyond the flange 4 so as to be almost adjacent to the wall of the casing 1. By means of a boss 9 the arms 5, 6, 7 loosely rest on the shaft 2 and either cooperate in the rotation thereof, owing to the friction produced, thus causing the strippers 8 to move over the flange 4, or they may be driven directly at predetermined speeds. The mass entering the conveyor 3 through the opening 10 in the bottom is forced upwardly by centrifugal force and the propeller-like blades 12 disposed inside the conveyor 3, moves over the inclined flange 4 and against the strippers 8 and is pushed by the latter up to the inner wall of the casing 1.

According to the construction shown in Fig. 2, inside the conveyor 3 and between the arms 5 a partition 11 is inserted which stops the mass revolving inside the conveyor 3 and drives it upwardly beyond the flange 4. The conveyor 3 is provided with a cover 13 which can be vertically fixed in position and adjusted relative to the guide pins 14 to form a gap 15 between the flange 4 and the cover 13 which are separately arranged. The cover 13 can remain stationary or rotate with the slowly moving agitator arms 5, and its speed differs therefore from that of the conveyor 3, so that relative motion is produced between them. In the gap 15 one or several wedgelike strippers 16 may be disposed radially or tangentially to the conveyor 3, and the mass driven into the gap 15 is not only forced towards it by centrifugal force or the relative motion existing between the flange 4 and the cover 13 but is stripped off by the strippers 16 and pressed out under increased pressure of the mass following. The wedgelike strippers 16 can be adjustable to be adapted to any change in the gap 15. The faces 17 of the flange 4 are smooth, rough or provided with a single or multiple thread spiral slot by means of which the outward drive of the mass is improved still more.

While the mass is rotated in the conveyor 3 it is forced out under pressure through the gap 15, and during this operation all the coarser and finer parts thereof, including microscopically small particles, lumps or the like, are completely broken up and decomposed, so that the rotary conveyor 3 will effect not only thorough mixing of the substances but also bring about the complete pulverization, intimate combination and refinement of the smallest particles of the mass or its emulsification in a very short time.

The wedgelike form of the gap between the top flange 4 and the cover 13 can be produced by imparting a corresponding shape to the flange or cover, or the gap 15 may be disposed almost parallel instead of being shaped like a wedge. In this case the faces of the gap 15 are often carefully machined and polished, though they may be roughened also to meet the requirements of the materials treated. A conveyor having a wide gap is employed for instance for breaking up thick knots in viscose production while an almost parallel gap having smooth faces serves for producing emulsions from liquids or very thinly liquid masses which contain only very small granules.

Above the cover 13 a rotary stripper 18 is arranged for throwing off mass portions that might accumulate on the cover.

I claim:—

A machine for decomposing, mixing and working liquid, granular or pulverulent masses, comprising a lower part constructed as rotary conveyor and an upper part forming a cover arranged at a distance above said rotary conveyor and being independent therefrom, said lower and upper parts forming between them an annular gap of conical cross section increasing towards the inside of the conveyor, the masses being pressed through said conical gap by centrifugal force and, on entering the gap, disintegrated by the cooperation of the said upper and lower parts rotating at different speeds, spiral slots on said rotary conveyor adjacent said conical gap, and wedgelike adjustable strippers extending into said gap and being disposed radially to the center of the conveyor.

HEINRICH HORN.